United States Patent
Nakabayashi

(10) Patent No.: US 12,189,403 B2
(45) Date of Patent: Jan. 7, 2025

(54) AIRCRAFT CONTROL APPARATUS, AIRCRAFT CONTROL METHOD, AND NON-TRANSITORY COMPUTER-READABLE MEDIUM

(71) Applicant: NEC Corporation, Tokyo (JP)

(72) Inventor: Tatsuhiko Nakabayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 219 days.

(21) Appl. No.: 17/800,729

(22) PCT Filed: Mar. 11, 2020

(86) PCT No.: PCT/JP2020/010479
§ 371 (c)(1),
(2) Date: Aug. 18, 2022

(87) PCT Pub. No.: WO2021/181554
PCT Pub. Date: Sep. 16, 2021

(65) Prior Publication Data
US 2023/0094918 A1    Mar. 30, 2023

(51) Int. Cl.
*B64C 13/20*    (2006.01)
*B64C 39/02*    (2023.01)
(Continued)

(52) U.S. Cl.
CPC ............. *G05D 1/12* (2013.01); *B64C 39/024* (2013.01); *G05D 1/0038* (2013.01);
(Continued)

(58) Field of Classification Search
CPC .......... G05D 1/12; G05D 1/0094; G06T 7/70; G06T 7/0004; G06T 11/203; G06T 2207/10032; B64U 2101/30; B64C 39/024

See application file for complete search history.

(56) References Cited

U.S. PATENT DOCUMENTS

2017/0010816 A1    1/2017    Tanaka et al.
2017/0324907 A1*   11/2017   Sabe .................... G05D 1/0016
2019/0212741 A1    7/2019    Lee et al.

FOREIGN PATENT DOCUMENTS

JP    2005-265699 A    9/2005
JP    2018-156491 A    10/2018
(Continued)

OTHER PUBLICATIONS

Machine Translation—KR102344195B1—Park et al.—2020 (Year: 2020).*

(Continued)

*Primary Examiner* — Jess Whittington
*Assistant Examiner* — Rami Nabih Bedewi

(57) ABSTRACT

An aircraft control apparatus (20) includes a display unit (210), a display (220), an input unit (230), a selection unit (240), and a command generation unit (250). The command generation unit (250) acquires an image that has been generated by an image capture unit (350) of an aircraft (30). The display unit (210) displays, on the display (220), the image acquired by the command generation unit (250). The image includes at least one electric wire or at least one pipe that could be an inspection target. The input unit (230) displays, according to an input from a user, a line within the image displayed on the display (220). The selection unit (240) selects an inspection target by use of the line displayed by the input unit (230). The command generation unit (250) generates command information for the aircraft to photograph the inspection target while moving along the inspection target, and transmitting the command information to the aircraft (30).

6 Claims, 12 Drawing Sheets

(51) Int. Cl.
*B64U 10/13* (2023.01)
*B64U 10/17* (2023.01)
*G01C 21/20* (2006.01)
*G05D 1/00* (2006.01)
*G05D 1/10* (2006.01)
*G06T 7/00* (2017.01)
*G06T 7/70* (2017.01)
*G06T 11/20* (2006.01)
*G08G 5/00* (2006.01)
*B64U 101/30* (2023.01)

(52) U.S. Cl.
CPC ........... *G05D 1/0094* (2013.01); *G05D 1/101* (2013.01); *G06T 7/0004* (2013.01); *G06T 7/70* (2017.01); *G06T 11/203* (2013.01); *B64U 2101/30* (2023.01); *B64U 2201/10* (2023.01); *B64U 2201/20* (2023.01); *G06T 2207/10032* (2013.01)

(56) References Cited

FOREIGN PATENT DOCUMENTS

| | | |
|---|---|---|
| JP | 2018-160228 A | 10/2018 |
| JP | 2018-169995 A | 11/2018 |
| JP | 2019-196980 A | 11/2019 |
| KR | 102344195 B1 * | 1/2020 ............. B64C 39/02 |
| WO | 2015/163106 A1 | 10/2015 |

OTHER PUBLICATIONS

Machine Translation of Foreign Reference—KR102344195B1—Park et al. (Year: 2020).*
International Search Report for PCT Application No. PCT/JP2020/010479, mailed on Jun. 9, 2020.
JP Office Action for Japanese Patent Application No. 2023-144190, mailed on May 28, 2024 with English Translation.

\* cited by examiner

AIRCRAFT CONTROL APPARATUS, AIRCRAFT CONTROL METHOD, AND NON-TRANSITORY COMPUTER-READABLE MEDIUM

This application is a National Stage Entry of PCT/JP2020/010479 filed on Mar. 11, 2020, the contents of all of which are incorporated herein by reference, in their entirety.

TECHNICAL FIELD

The present invention relates to an aircraft control apparatus, an aircraft control method, and a program.

BACKGROUND ART

In recent years, inspecting an inspection target by use of an aircraft such as a drone has been performed. For example, Patent Document 1 describes inspecting a structure such as a steel tower by using a drone.

RELATED DOCUMENT

Patent Document

[Patent Document 1] Japanese Patent Application Publication No. 2019-196980

DISCLOSURE OF THE INVENTION

Technical Problem

The present inventor has considered inspecting an inspection target having a certain degree of length, such as an electric wire or a pipe, by use of an aircraft, such as a drone. Herein, a plurality of electric wires and pipes may be arranged in parallel. In such a case, an inspector needs to specify an electric wire or a pipe to be an inspection target.

One example of an object of the present invention is to facilitate specifying an electric wire or a pipe to be an inspection target, when inspecting an electric wire, a pipe, or the like by use of an aircraft.

Solution to Problem

The present invention provides an aircraft control apparatus including:
a display unit that displays, on a display, an image being captured by an image capture unit included in an aircraft, and including at least one electric wire or at least one pipe that could be an inspection target;
an input unit that draws a line within the image according to an input from a user;
a selection unit that selects an inspection target by use of the line; and
a command generation unit that generates command information for the aircraft to photograph the inspection target while moving along the inspection target, and transmits the generated command information to the aircraft.

The present invention provides an aircraft control method including:
by a computer,
displaying, on a display, an image being captured by an image capture unit included in an aircraft, and including at least one electric wire or at least one pipe that could be an inspection target;
drawing a line within the image according to an input from a user;
selecting an inspection target by use of the line; and
generating command information for the aircraft to photograph the inspection target while moving along the inspection target, and transmitting the generated command information to the aircraft.

The present invention provides a program causing a computer to include:
a display function of displaying, on a display, an image being captured by an image capture unit included in an aircraft, and including at least one electric wire or at least one pipe that could be an inspection target;
an input function of drawing a line within the image according to an input from a user;
a selection function of selecting an inspection target by use of the line; and
a command generation function of generating command information for the aircraft to photograph the inspection target while moving along the inspection target, and transmitting the generated command information to the aircraft.

Advantageous Effects of Invention

The present invention facilitates specifying an electric wire or a pipe to be an inspection target, when inspecting an electric wire, a pipe, or the like by use of an aircraft.

BRIEF DESCRIPTION OF THE DRAWINGS

The above-described object, other objects, features, and advantageous effects will become more apparent from a preferred example embodiment described below and the following accompanying drawings.

DESCRIPTION OF EMBODIMENTS

Hereinafter, an example embodiment of the present invention is described by use of the drawings. Note that, a similar reference sign is assigned to a similar component in all the drawings, and description thereof is not repeated as appropriate.

Figure 1:
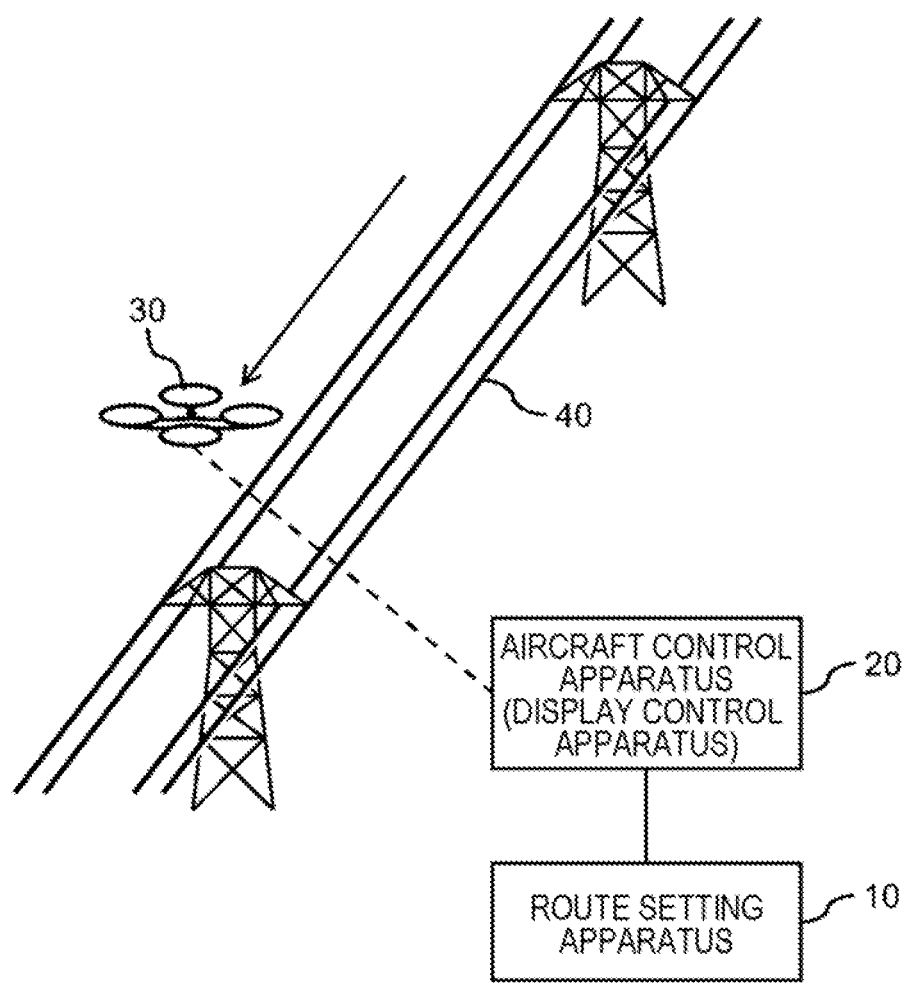
FIG. 1 is a diagram illustrating a usage environment of a route setting apparatus and an aircraft control apparatus (one example of a display control apparatus) according to an example embodiment.

FIG. 1 is a diagram describing a usage environment of a route setting apparatus 10 and an aircraft control apparatus 20 (one example of a display control apparatus) according to an example embodiment. The route setting apparatus 10 and the aircraft control apparatus 20 are used when an inspection target is inspected by use of an aircraft 30. Note that, the route setting apparatus 10 and the aircraft control apparatus 20 may consist of one apparatus.

An inspection target is, for example, a continuously extending object, such as an electric wire or a pipe. An electric wire may be, for example, a power transmission line, or may be a transmission line that transmits a signal. A power transmission line may be a high-voltage power line, or may be an overhead wire for a train. Moreover, a pipe may be, for example, a pipeline, or may be a pipe placed within a premise of a factory.

The aircraft 30 is, for example, a drone or an unmanned helicopter, and is operated from outside by use of wireless communication. The aircraft 30 includes an image capture unit 350 (see FIG. 4), and generates image data by capturing an image of an inspection target during flight. When this image capturing is performed, the aircraft 30 needs to fly keeping away from the inspection target to a certain degree. Particularly in a case where an inspection target is an electric wire for power transmission, an electromagnetic wave generated from the electric wire has a possibility of affecting flight of the aircraft 30, and, therefore, it is necessary to keep a distance between a flight route and the inspection target when the flight route is set. The route setting apparatus 10 is used when a flight route of the aircraft 30 is set. Then, the aircraft control apparatus 20 performs processing for causing the aircraft 30 to fly according to a flight route set by the route setting apparatus 10.

Moreover, the aircraft control apparatus 20 also performs control of an image capture direction and magnification of the image capture unit 350. Herein, a plurality of electric wires or pipes may be placed in parallel with each other. In such a case, it is necessary to set an electric wire or a pipe to be an inspection target from among a plurality of electric wires or pipes. The aircraft control apparatus 20 is also used when an inspection target is selected from among a plurality of electric wires or pipes.

Figure 2:
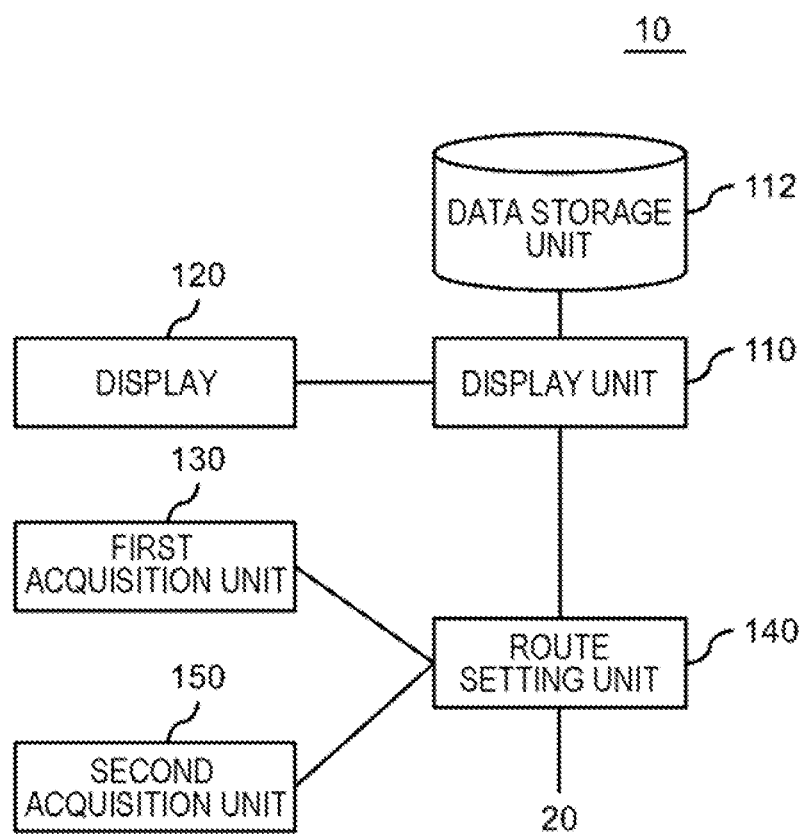
FIG. 2 is a diagram illustrating one example of a functional configuration of the route setting apparatus.

FIG. 2 is a diagram illustrating one example of a functional configuration of the route setting apparatus 10. The route setting apparatus 10 includes a first acquisition unit 130 and a route setting unit 140. The first acquisition unit 130 acquires specification information that specifies a plurality of points. When setting a plurality of the points, inspectors superimpose each of the plurality of points on an inspection target. The route setting unit 140 takes, as a flight route of the aircraft, a line connecting points acquired by moving the plurality of points indicated by the specification information in the same direction and for the same distance. In a first example, the route setting unit 140 sets a temporary flight route by connecting a plurality of points indicated by the specification information. Then, the route setting unit 140 sets a flight route by moving the temporary flight route. In a second example, the route setting unit 140 moves a plurality of points indicated by the specification information in the same direction and for the same distance. Then, the route setting unit 140 sets a flight route of the aircraft by connecting the plurality of points after movement.

In the example illustrated in the present figure, the route setting apparatus 10 further includes a display unit 110, a data storage unit 112, a display 120, and a second acquisition unit 150.

The data storage unit 112 stores map data or an image photographed from the sky (e.g., an aerial photograph or a satellite photograph). The display unit 110 reads map data or an image of an inspection target and a periphery thereof, and displays the read map data or the read image on the display 120, according to an instruction from a user.

In the map data or the image stored by the data storage unit 112, each point is associated with position information (e.g., latitude and longitude information) of the point. Then, the first acquisition unit 130 acquires, as the above-described specification information, information that determines a plurality of points selected on the map or the image displayed on the display 120. The route setting unit 140 acquires position information regarding each of a plurality of points specified by the pieces of the specification information, and sets a temporary flight route by use of the pieces of the position information.

The second acquisition unit 150 acquires information (hereinafter, referred to as movement instruction information) indicating a movement distance of a plurality of points indicated by specification information. The movement instruction information may include a movement direction of each of a plurality of points. Herein, the same movement distance is applied to all of a plurality of points. Then, the route setting unit 140 sets a flight route by use of the movement instruction information.

The first acquisition unit 130 and the second acquisition unit 150 acquire, for example, necessary information via an input device such as a mouse. However, when the display 120 is a touch panel, at least one of the first acquisition unit 130 and the second acquisition unit 150 may acquire necessary information via the display 120.

For example, the first acquisition unit 130 acquires, as specification information, information indicating a point selected by a mouse, or information indicating a point which is touch-input on the display 120. Moreover, the second acquisition unit 150 acquires, as movement instruction information, a slide input performed to the display 120. In this case, a slide amount indicates a movement distance. Moreover, in some cases, a slide direction may indicate a movement direction.

Figure 3:
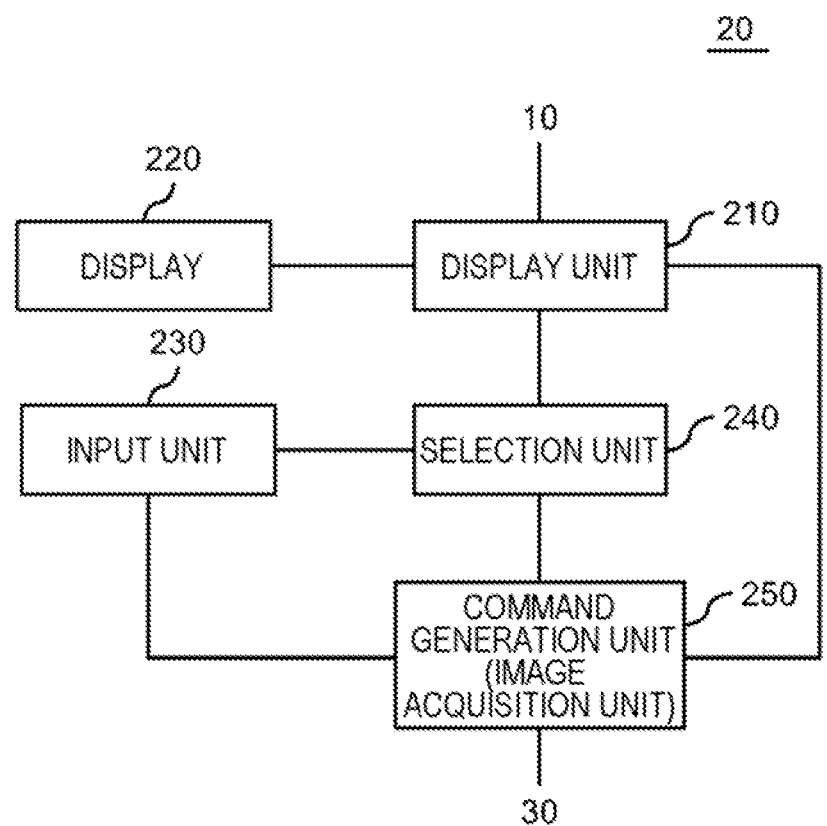
FIG. 3 is a diagram illustrating one example of a functional configuration of the aircraft control apparatus.

FIG. 3 is a diagram illustrating one example of a functional configuration of the aircraft control apparatus 20. The aircraft control apparatus 20 includes a display unit 210, a display 220, an input unit 230, a selection unit 240, and a command generation unit 250.

The command generation unit 250 acquires an image generated by the image capture unit 350 of the aircraft 30. The display unit 210 displays, on the display 220, the image acquired by the command generation unit 250. This image includes at least one electric wire or at least one pipe that could be an inspection target. The input unit 230 displays a line in the image displayed on the display 220 according to an input from a user. The selection unit 240 selects an electric wire or a pipe to be an inspection target, by use of the line displayed by the input unit 230. For example, when a plurality of electric wires or pipes are included in an image, the selection unit 240 selects an inspection target from among the plurality of electric wires or pipes by use of the line displayed by the input unit 230. The command generation unit 250 generates command information for the aircraft to photograph the inspection target while moving along the inspection target, and transmits the command information to the aircraft 30. As one example, the command generation unit 250 generates command information in such a way as to cause the aircraft 30 to fly according to a flight route generated by the route setting apparatus 10.

Note that, when a flight route generated by the route setting apparatus 10 is two-dimensional information (e.g., latitude and longitude information), the command generation unit 250 acquires information indicating a flight height (hereinafter, referred to as height information) of the aircraft 30, in addition to a flight route. For example, a person who performs an inspection of an inspection target (hereinafter, referred to as an inspector) inputs height information to the input unit 230. The height information may be a fixed value, or may change along a flight route. The command generation unit 250 includes the height information in command information.

While flying, the aircraft 30 repeatedly transmits position information of the aircraft 30 to the aircraft control apparatus 20. In consequence, the command generation unit 250 of the aircraft control apparatus 20 repeatedly generates command information by use of the position information in such a way that the aircraft 30 moves along a flight route, and transmits the generated command information to the aircraft 30.

Furthermore, while the aircraft 30 is flying, the image capture unit 350 of the aircraft 30 repeatedly generates an image. The command generation unit 250 repeatedly acquires the image generated by the image capture unit 350. Then, the command generation unit 250 generates command information, based on a position of an inspection target in an image, each time the image is acquired. For example, the command generation unit 250 controls a height of the aircraft 30 in such a way that the inspection target comes to a center in the image.

Moreover, the command information includes information (hereinafter, referred to as control information) for controlling the image capture unit 350. The control information is information for controlling at least one of a photographing direction and magnification of the image capture unit 350. For example, the command generation unit 250 generates control information relating to a photographing direction of the image capture unit 350 in such a way that the inspection target comes to a center in the image. Moreover, the command generation unit 250 generates control information relating to magnification of the image capture unit 350 in such a way that a size of a photographing target becomes within a criterion range.

Note that, the input unit 230 acquires necessary information via an input device such as a mouse. However, when the display 220 is a touch panel, the input unit 230 may acquire necessary information via the display 220. For example, the input unit 230 takes, as information for selecting an inspection target, a line input to (drawn on) a touch panel by use of a pen, a finger, or the like.

Moreover, each time the command generation unit 250 acquires an image from the aircraft 30, the display unit 210 displays the image on the display 220. In this instance, the display unit 210 determines a position of an inspection target within the image, and then displays at least two markers indicating the inspection target. The two markers are arranged along the inspection target in such a way that the inspection target is positioned between the two markers. The marker is, for example, a solid line, but may be a dotted line or a dash-dotted line.

In this instance, the display unit 210 acquires information (hereinafter, referred to as inspection target determination information) that determines an inspection target. The inspection target determination information indicates, for example, a position of the inspection target in a previous image. In this case, first, the display unit 210 generates inspection target determination information by use of information indicating a position of the inspection target within an image used when the selection unit 240 determines the inspection target. Then, the display unit 210 determines a position of the inspection target in a next image by use of the inspection target determination information, and generates a next piece of inspection target determination information. The display unit 210 repeats these pieces of processing, and thereby determines a position of the inspection target in each of a plurality of images generated by the aircraft 30.

Note that, a marker preferably has a predetermined color, for example, red. In this way, an inspector can easily recognize an electric wire or a pipe recognized as an inspection target by the aircraft control apparatus 20. As a result, when the aircraft control apparatus 20 recognizes an erroneous electric wire or pipe as an inspection target, an inspector can immediately cope with the error.

Figure 4:
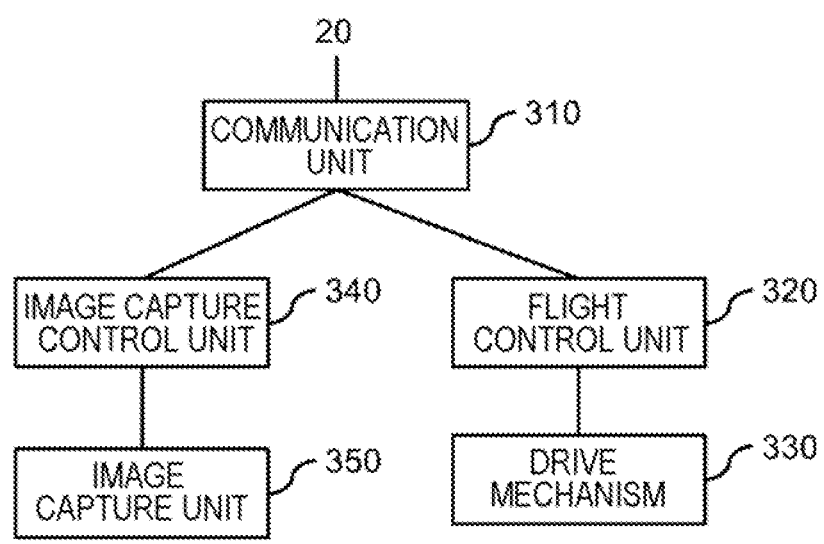
FIG. 4 is a diagram illustrating one example of a functional configuration of an aircraft.

FIG. 4 is a diagram illustrating one example of a functional configuration of the aircraft 30. In the example illustrated in the present figure, the aircraft 30 includes a communication unit 310, a flight control unit 320, a drive mechanism 330, an image capture control unit 340, and the image capture unit 350.

The communication unit 310 communicates with the aircraft control apparatus 20, receives command information from the aircraft control apparatus 20, and transmits, to the aircraft control apparatus 20, an image generated by the image capture unit 350. The drive mechanism 330 includes a mechanism that controls a motor that drives a propeller of the aircraft 30, and an angle of the propeller. The flight control unit 320 controls the drive mechanism 330 in response to command information transmitted from the aircraft control apparatus 20. In this instance, the flight control unit 320 recognizes a current position of the aircraft 30 by use of a GPS or the like. Then, the flight control unit 320 controls movement of the aircraft 30 by use of a current position of the aircraft 30 and command information. Thereby, the aircraft 30 can fly according to a flight route set by the route setting apparatus 10, in a state where a height set by the aircraft control apparatus 20 is maintained.

The image capture control unit 340 controls the image capture unit 350 in response to control information included in command information. For example, the image capture control unit 340 controls a photographing direction of the image capture unit 350 in such a way that an inspection target comes to a center in the image. Moreover, the image capture control unit 340 controls magnification of the image capture unit 350 in such a way that a size of a photographing target becomes within a criterion range. Then, the image capture control unit 340 transmits the image generated by the image capture unit 350, to the aircraft control apparatus 20 via the communication unit 310.

Figure 5:
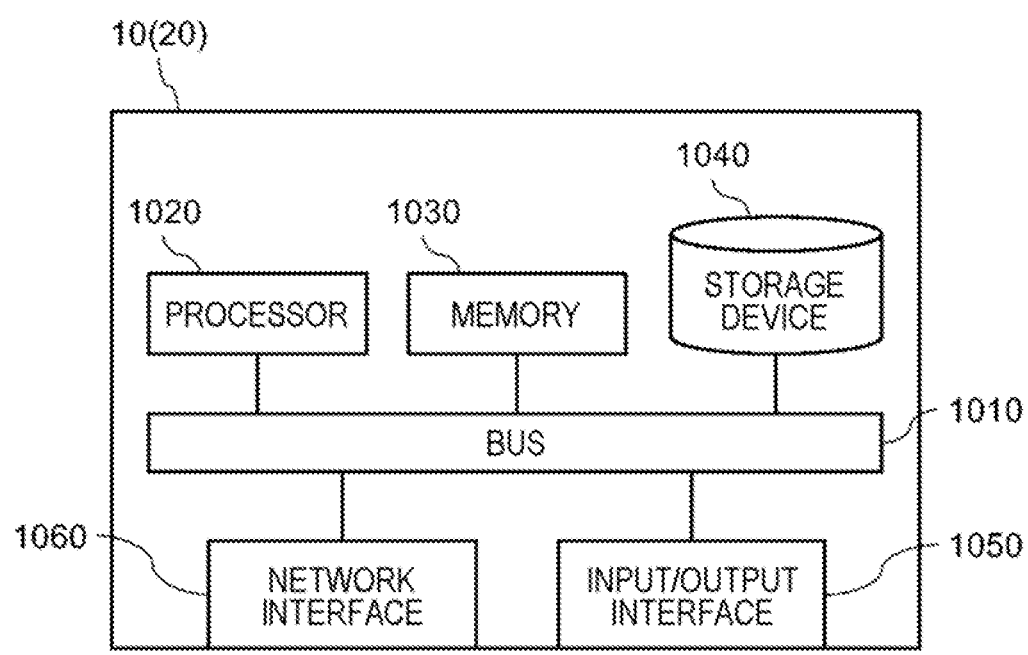
FIG. 5 is a diagram illustrating a hardware configuration example of the route setting apparatus.

FIG. 5 is a diagram illustrating a hardware configuration example of the route setting apparatus 10. The route setting apparatus 10 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit/receive data to/from one another. However, a method of mutually connecting the processor 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (e.g., the display unit 110, the first acquisition unit 130, the route setting unit 140, and the second acquisition unit 150) of the route setting apparatus 10. The processor 1020 reads each of the program modules onto the memory 1030, executes the read program module, and thereby achieves each function being related to the program module. Moreover, the storage device 1040 also functions as the data storage unit 112.

The input/output interface 1050 is an interface for connecting a main unit of the route setting apparatus 10 and various input/output equipment with each other. For example, the display 120 communicates with the processor 1020 via the input/output interface 1050.

The network interface 1060 is an interface for connecting the route setting apparatus 10 to a network. The network is, for example, a local area network (LAN) or a wide area network (WAN). A method of connecting the network interface 1060 to a network may be wireless connection or may be wired connection. The route setting apparatus 10 may communicate with the aircraft control apparatus 20 via the network interface 1060.

Note that, a hardware configuration of the aircraft control apparatus 20 is similar to the example illustrated in FIG. 5. In this case, the storage device 1040 stores a program module that achieves each function (e.g., the display unit 210, the input unit 230, the selection unit 240, and the command generation unit 250) of the aircraft control apparatus 20. Moreover, the display 220 communicates with the processor 1020 via the input/output interface 1050. Then, the aircraft control apparatus 20 may communicate with the route setting apparatus 10 and the aircraft 30 via the network interface 1060.

Figure 6:
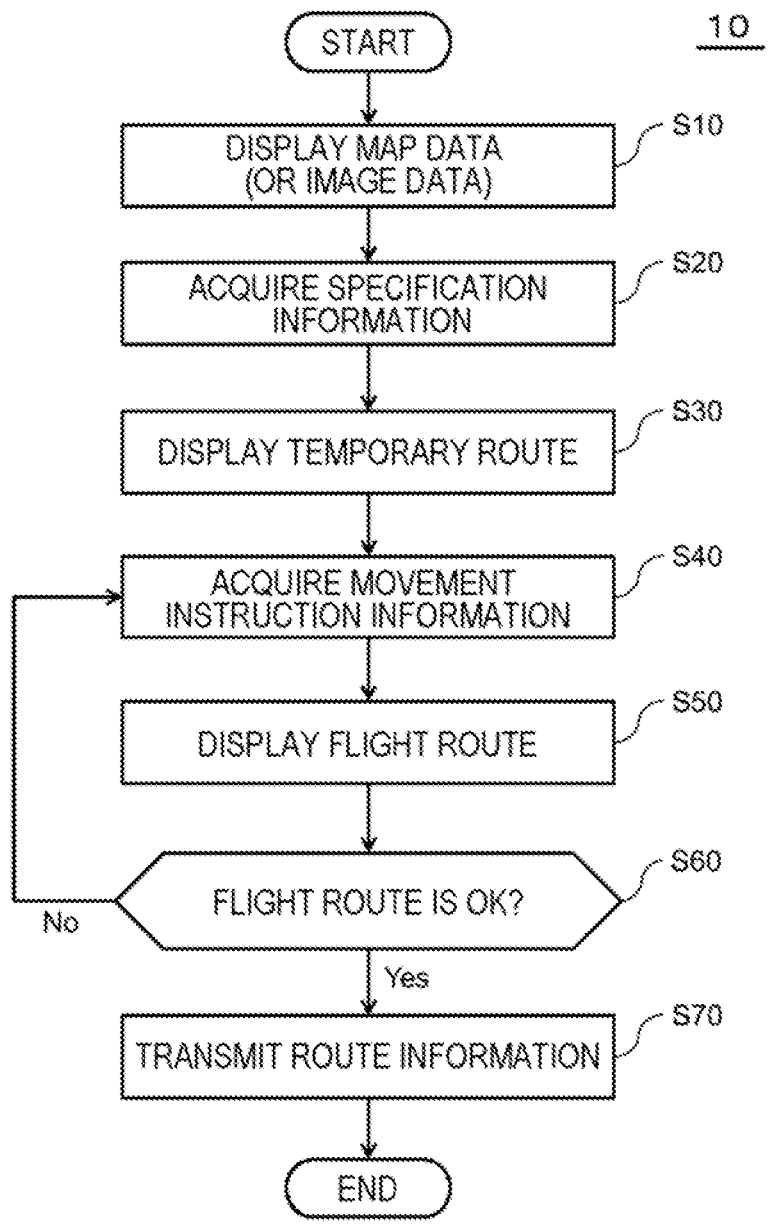
FIG. 6 is a flowchart illustrating one example of processing performed by the route setting apparatus.

FIG. 6 is a flowchart illustrating one example of processing performed by the route setting apparatus 10. In the processing illustrated in the present figure, the route setting apparatus 10 sets a flight route of the aircraft 30.

First, the display unit 110 of the route setting apparatus 10 reads, from the data storage unit 112, map data or image data of a place where an inspection target is present, according to an input from an inspector, and displays the map data or image data on the display 120 (step S10). Then, the inspector inputs, to the first acquisition unit 130, specification information that specifies a plurality of points (step S20). For example, when an inspection target is an electric wire, the inspector selects, as specification information, a point where a power pole or a power transmission tower is present.

Next, the route setting unit 140 generates a temporary route by connecting a plurality of points indicated by the specification information. The display unit 110 displays the temporary route on the display 120 over the map or the image displayed in step S10 (step S30).

Next, an inspector inputs movement instruction information to the second acquisition unit 150. The movement instruction information includes at least a distance for which the temporary route should be moved. Then, the route setting unit 140 generates a flight route by moving the temporary route in response to the movement instruction information. Herein, a movement direction of the temporary route may be, for example, a perpendicular direction to a straight line indicating the temporary route. For example, when the temporary route is indicated with a polygonal line, the route setting unit 140 moves each straight line constituting the polygonal line, in a direction being perpendicular to the straight line. This allows a flight route to be parallel to a temporary route. Each movement distance of each line in this instance is a distance indicated by movement instruction information. Then, the display unit 110 displays the flight route on the display 120 over the map or the image displayed in step S10 (step S50).

An inspector checks a flight route displayed on the display 120. When the flight route is acceptable (step S60: Yes), the inspector performs, to the second acquisition unit 150, input for finalizing the flight route. Then, the route setting unit 140 transmits the generated flight route to the aircraft control apparatus 20 (step S70). On the other hand, when the flight route is corrected (step S60: No), a return is made to step S40.

Figure 7:
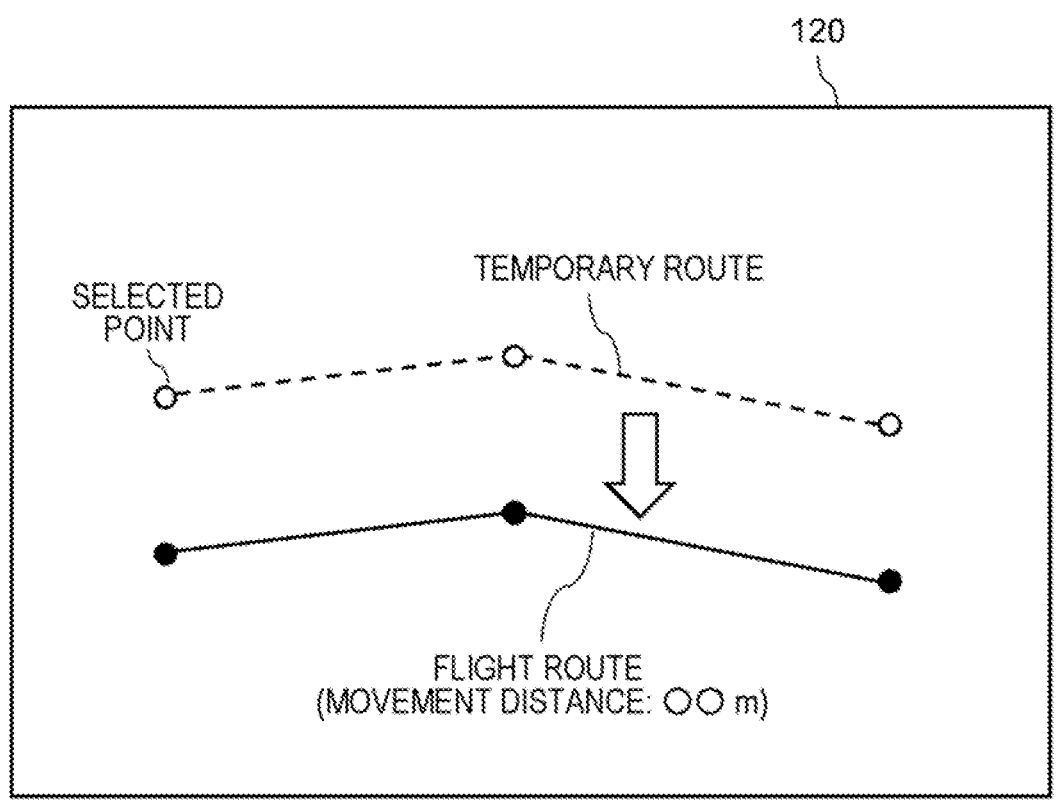
FIG. 7 is a diagram illustrating one example of a screen displayed on a display in step S50.

FIG. 7 is a diagram illustrating one example of a screen displayed on the display 120 in step S50. In step S10, the display unit 110 displays, on the display 120, a map or an image photographed from the sky. Then, in step S30, the display unit 110 displays, on the display 120, a temporary route over the map or the image. Further, in step S50, the display unit 110 displays, on the display 120, a flight route over the map or the image. In this instance, the display unit 110 displays, on the display 120, a distance from a temporary route up to a flight route, i.e., a movement distance indicated by movement instruction information. In this way, since an inspector can check a distance between a temporary route and a flight route, i.e., a distance from an inspection target up to the aircraft 30, it becomes easy to check validity of a flight route. Note that, when an inspection target is a high-voltage power line, a distance between a temporary route and a flight route is preferably, for example, equal to or more than 10 m and equal to or less than 15 m.

Figure 8:
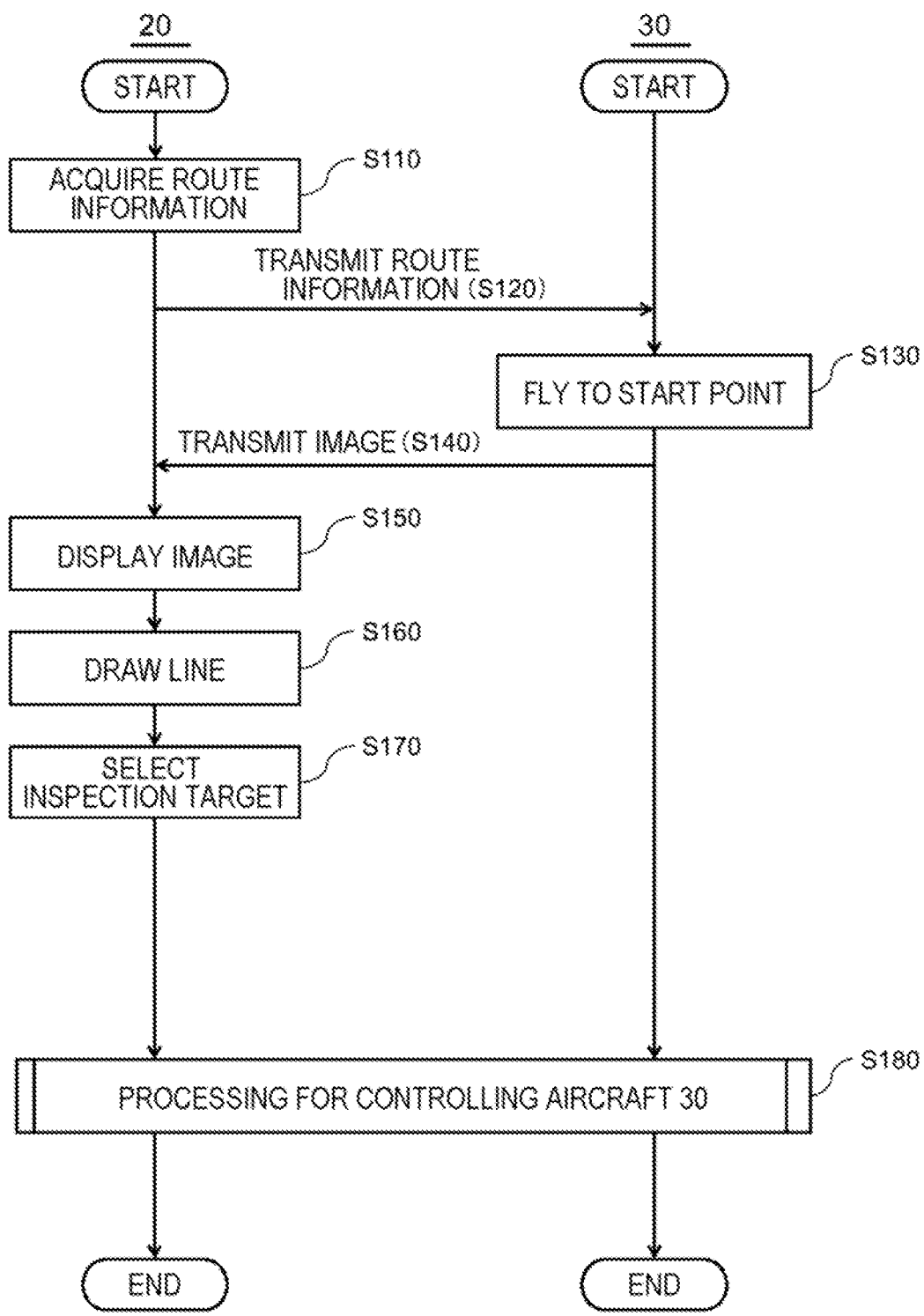
FIG. 8 is a flowchart illustrating one example of processing of controlling an aircraft by the aircraft control apparatus.

FIG. 8 illustrates one example of processing of controlling the aircraft 30 by the aircraft control apparatus 20. In the processing illustrated in the present figure, while the aircraft 30 is flying, the image capture unit 350 of the aircraft 30 repeatedly generates an image. Then, each time the image capture unit 350 generates an image, the image capture control unit 340 of the aircraft 30 transmits the image to the aircraft control apparatus 20.

First, the display unit 210 of the aircraft control apparatus 20 acquires a flight route from the route setting apparatus 10 (step S110). In consequence, the command generation unit 250 of the aircraft control apparatus 20 generates command information indicating a start point of the flight route, and transmits the generated command information to the aircraft 30 (step S120).

In consequence, the flight control unit 320 of the aircraft 30 recognizes a start point of the flight route, and causes the aircraft 30 to fly to the start point (step S130). In this instance, the aircraft 30 is at a specified height. Thereby, the image capture unit 350 of the aircraft 30 can generate an image at the start point. The image includes an inspection target. Then, the image capture control unit 340 of the aircraft 30 transmits the image to the aircraft control apparatus 20 (step S140).

The command generation unit 250 of the aircraft control apparatus 20 receives an image transmitted from the aircraft 30. Then, the display unit 210 displays the image on the display 220 (step S150). The image includes a plurality of electric wires or pipes that could be an inspection target. Accordingly, an inspector draws, on an image, a line along an electric wire or a pipe that should be taken as an inspection target, via the input unit 230 of the aircraft control apparatus 20 (step S160). In consequence, the selection unit 240 of the aircraft control apparatus 20 selects, as an inspection target, an electric wire or a pipe being nearest to the line (step S170). A specific example of a selection method of an inspection target is described later by use of another figure.

Thereafter, processing for controlling flight of the aircraft 30 is performed (step S180). A detailed example of the processing for control is described by use of another figure.

Note that, when an inspection target is an electric wire, at least one power pole or one power transmission tower may be included in a middle of one flight route. In this case, each time the aircraft 30 passes the power pole or the power transmission tower, processing from step S130 up to step S180 is repeated.

Figure 9:
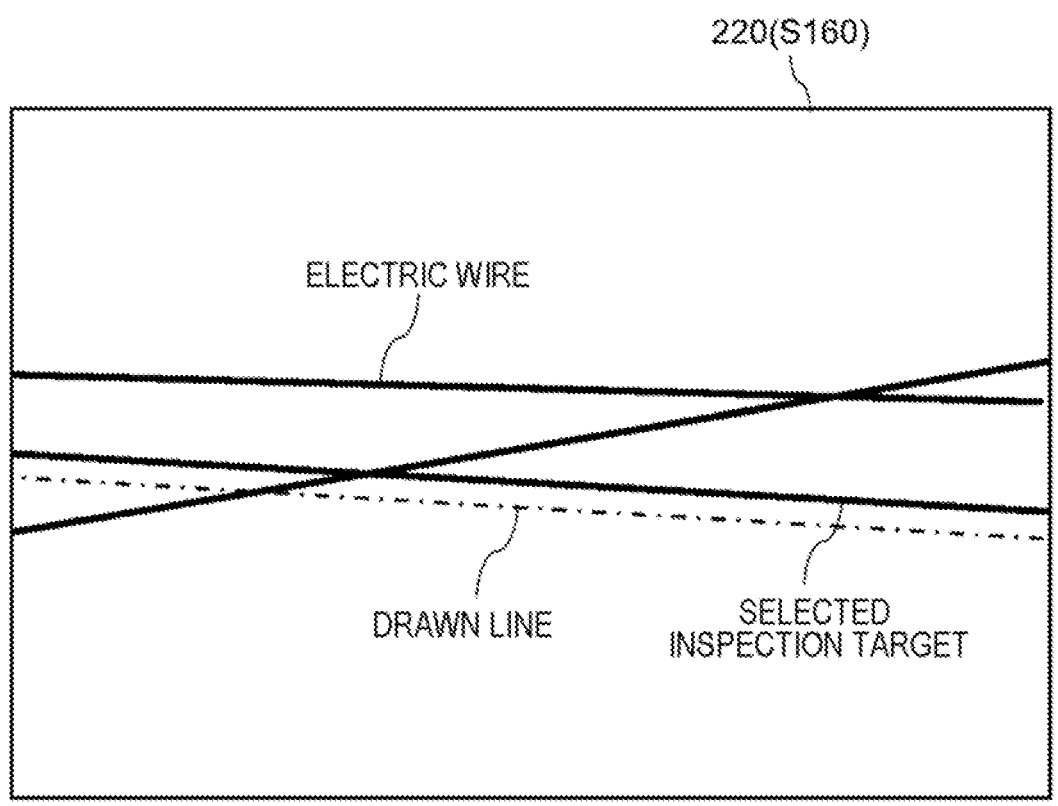
FIG. 9 is a diagram illustrating one example of a screen displayed by the display in step S160.

FIG. 9 illustrates one example of a screen displayed by the display 220 in step S160 in FIG. 8. As illustrated in the present figure, an image photographed by the image capture unit 350 of the aircraft 30 may include a plurality of electric wires or pipes (electric wires in the present figure). Then, the electric wires or the pipes are provided in parallel with each other in many cases. Thus, when an input method of selecting an inspection target is not elaborated, a possibility that the aircraft control apparatus 20 erroneously recognizes an inspection target becomes high.

In this regard, in the example illustrated in the present figure, an inspector inputs a line along an inspection target to the display 220 displaying an image. In consequence, the selection unit 240 of the aircraft control apparatus 20 selects, as an inspection target, an electric wire or a pipe being nearest to the line. Thus, it becomes easy for the inspector to select a desired electric wire or pipe as an inspection target.

Figure 10:
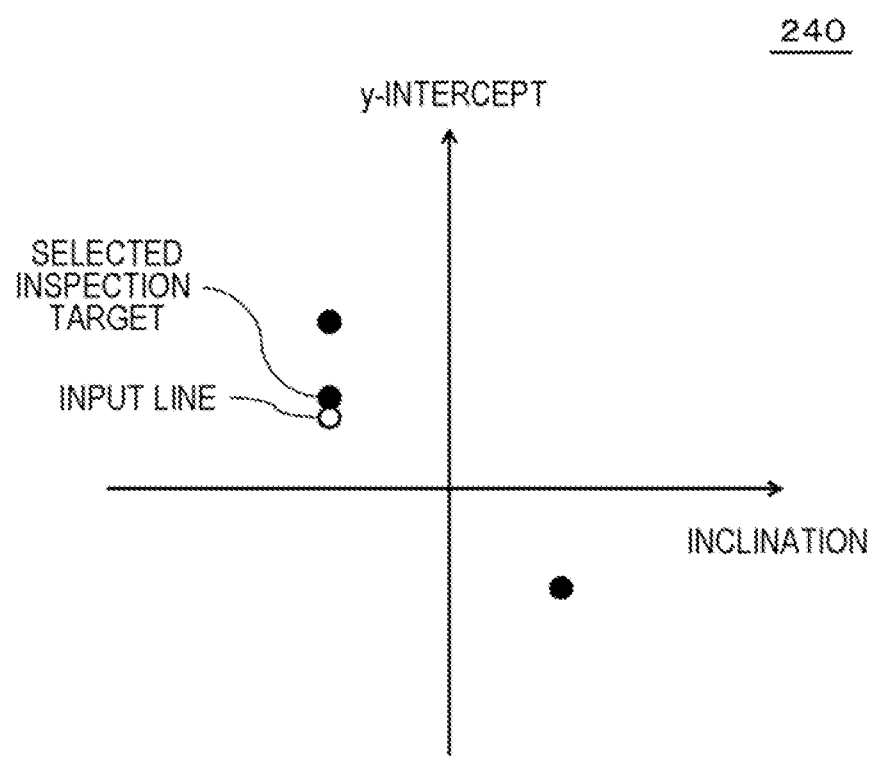
FIG. 10 is a diagram illustrating one example of processing when a selection unit selects an inspection target.

FIG. 10 illustrates one example of processing when the selection unit 240 selects an inspection target. In the example illustrated in the present figure, the selection unit 240 processes an image, thereby approximates, with a straight line, an electric wire or a pipe that could be an inspection target, and computes an inclination and a y-intercept of the straight line within the image. Moreover, the selection unit 240 also performs similar processing for a line input by an inspector, and computes an inclination and a y-intercept of the line. Then, the selection unit 240 selects, as an inspection target, an electric wire or a pipe being nearest to the line input by the inspector, in a two-dimensional plane constituted of an inclination and a y-intercept.

Figure 11:
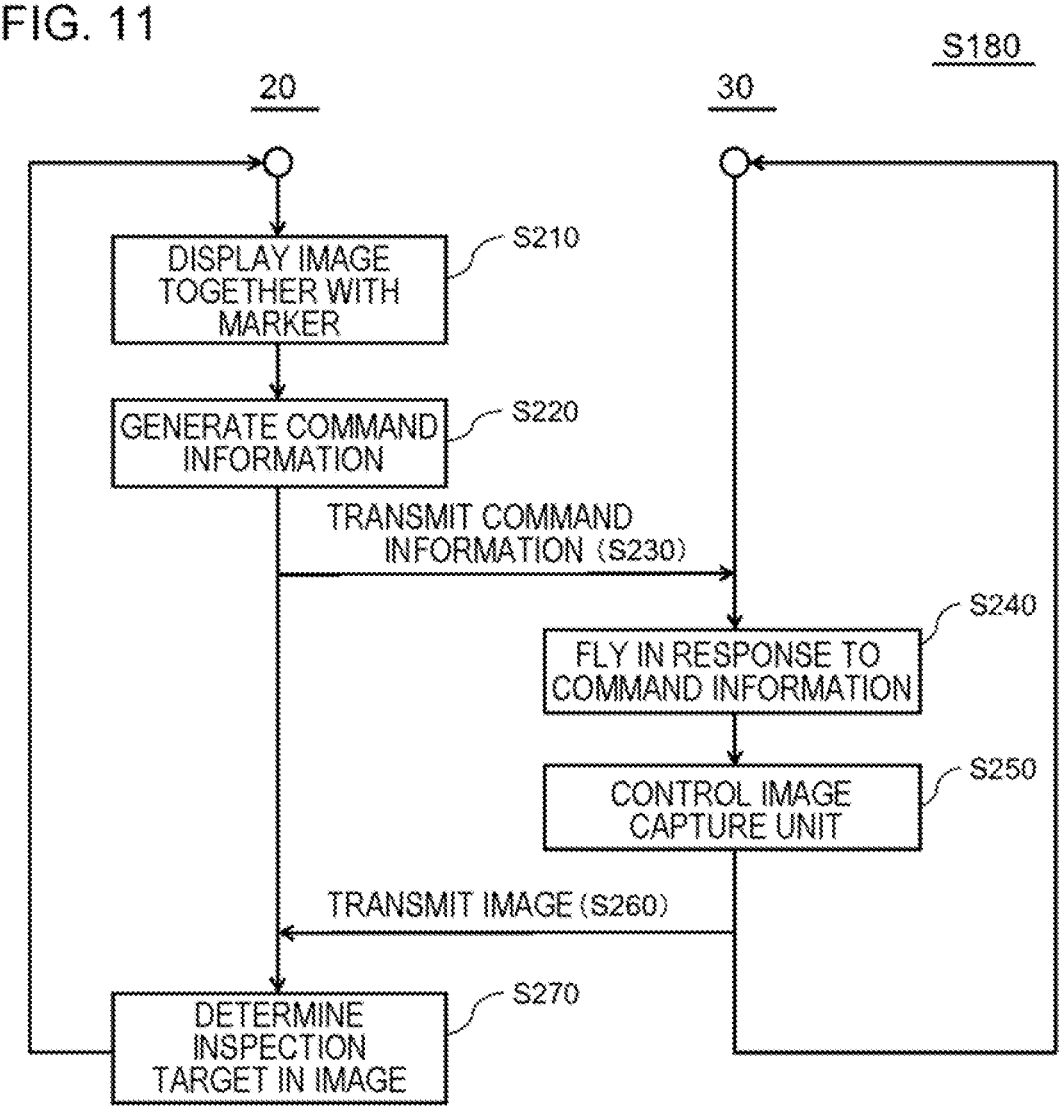
FIG. 11 is a flowchart illustrating a detail example of step S180 in FIG. 8.

FIG. 11 is a flowchart illustrating a detail example of step S180 in FIG. 8. The processing illustrated in the present figure is repeatedly performed while the aircraft 30 flies along an inspection target.

First, the display unit 210 of the aircraft control apparatus 20 displays, on the display 220, an image transmitted from the aircraft 30, and displays, on the displays 220, together with at least two markers indicating an inspection target (step S210). Moreover, the command generation unit 250 of the aircraft control apparatus 20 generates command information for causing the aircraft 30 to photograph the inspection target while flying along the inspection target (step S220), and transmits the command information to the aircraft 30 (step S230). As described above, the command information also includes control information for controlling at least one of a photographing direction and magnification of the image capture unit 350.

The flight control unit 320 of the aircraft 30 causes the aircraft 30 to fly in response to command information transmitted from the aircraft control apparatus 20 (step S240). Moreover, the image capture control unit 340 of the aircraft 30 controls at least one of a photographing direction and magnification of the image capture unit 350 in response to control information (step S250). Then, the image capture control unit 340 transmits, to the aircraft control apparatus 20, the image generated by the image capture unit 350 (step S260).

Thereafter, the display unit 210 of the aircraft control apparatus 20 determines a position of the inspection target in a newly acquired image, generates inspection target determination information by use of the position (step S270), and a return is made to step S210.

Note that, it is possible that the flight control unit 320 of the aircraft 30 performs the pieces of processing illustrated in steps S220 and S270 in FIG. 11. In this case, the command generation unit 250 of the aircraft control apparatus 20 first transmits, to the aircraft 30, determination information for determining an inspection target. One example of the determination information is a coordinate of an inspection target in a two-dimensional plane illustrated in FIG. 10. Thereafter, the aircraft 30 repeatedly performs processing illustrated in steps S220, S240, S250, and S270, in order to follow the determined inspection target. In this case as well, the image capture control unit 340 of the aircraft 30 repeatedly transmits, to the aircraft control apparatus 20, an image generated by the image capture unit 350 (step S260). Moreover, each time the aircraft control apparatus 20 acquires an image, the aircraft control apparatus 20 performs pieces of processing illustrated in steps S270 and S210.

Figure 12:
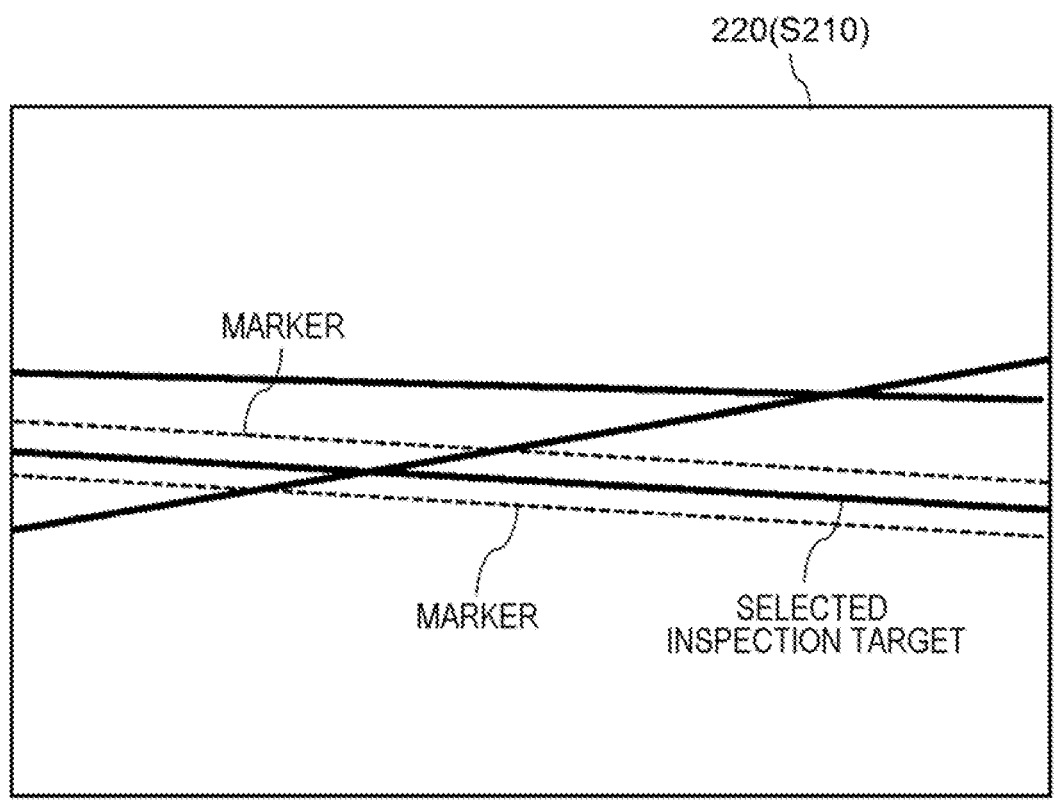
FIG. 12 is a diagram illustrating one example of a screen displayed on the display in step S210.

FIG. 12 illustrates one example of a screen displayed on the display 220 in step S210 in FIG. 11. As illustrated in the present figure, together with an image generated by the image capture unit 350 of the aircraft 30, two markers indicating an electric wire or a pipe recognized as an inspection target by the aircraft control apparatus 20 are displayed on the display 220. The two markers are arranged along an inspection target in such a way that the inspection target is positioned between the two markers. Thus, an inspector can easily recognize an electric wire or a pipe recognized as an inspection target by the aircraft control apparatus 20.

Note that, in step S210, the display unit 210 may perform image processing, and thereby detect an abnormality (e.g., a defect) occurring on an inspection target. In this case, the display unit 210 preferably displays a detected abnormality identifiably on the display 220. As one example, the display unit 210 may display a mark in a place where an abnormality is present. The mark is, for example, a frame having a predetermined color (e.g., red), but is not limited thereto.

As above, when inspecting an electric wire or a pipe by use of an aircraft 30, it is necessary to take, as a flight route, a place at a certain distance away from an electric wire or a pipe to be an inspection target. Herein, when the route setting apparatus 10 is used, the flight route can be easily set.

Moreover, in an image photographed by the aircraft 30, a plurality of electric wires or pipes to be inspection targets may be positioned in parallel. Herein, when the aircraft control apparatus 20 is used, an electric wire or a pipe desired as an inspection target by an inspector can be easily selected from among the plurality of electric wires or pipes.

Furthermore, together with an image generated by the image capture unit 350 of the aircraft 30, two markers indicating an electric wire or a pipe recognized as an inspection target by the aircraft control apparatus 20 are displayed in the aircraft control apparatus 20. The two markers are arranged along an inspection target in such a way that the inspection target is positioned between the two markers. Thus, an inspector can easily recognize an electric wire or a pipe recognized as an inspection target by the aircraft control apparatus 20. Then, when the aircraft control apparatus 20 recognizes an erroneous electric wire or pipe as an inspection target, an inspector can immediately cope with the error.

While the example embodiment of the present invention has been described above by use of the drawings, the example embodiment is exemplification of the present invention, and various configurations other than those described above can also be adopted.

Moreover, although a plurality of steps (pieces of processing) are described in order in a plurality of flowcharts used in the above description, an execution order of steps executed in each example embodiment is not limited to the described order. In each example embodiment, an order of illustrated steps can be changed to an extent that causes no problem in terms of content. Moreover, each example embodiment described above can be combined as far as contents do not contradict.

Some or all of the above-described example embodiments can also be described as, but are not limited to, the following supplementary notes.

1. An aircraft control apparatus including:
   a display unit that displays, on a display, an image being captured by an image capture unit included in an aircraft, and including at least one electric wire or at least one pipe that could be an inspection target;
   an input unit that draws a line within the image according to an input from a user;
   a selection unit that selects an inspection target by use of the line; and
   a command generation unit that generates command information for the aircraft to photograph the inspection target while moving along the inspection target, and transmits the generated command information to the aircraft.

2. The aircraft control apparatus according to supplementary note 1, in which,
   after the selection unit selects the inspection target,
   the command generation unit
      repeatedly acquires the image generated by the aircraft, and,
      when acquiring the image, generates the command information, based on a position of the inspection target within the image.

3. The aircraft control apparatus according to supplementary note 2, in which
   the image capture unit is capable of controlling at least one of a photographing direction and magnification, and
   the command information includes control information for controlling the at least one.

4. The aircraft control apparatus according to supplementary note 1, in which
   the command information includes determination information for the aircraft to determine the inspection target.

5. The aircraft control apparatus according to supplementary note 4, in which
   the selection unit
      approximates, with a straight line, the at least one electric wire or the at least one pipe within the image, and also approximates the input line with a straight line,
      selects, as the inspection target, the electric wire or the pipe nearest to the line, in a two-dimensional plane having, as variables, an inclination and a y-intercept that define a straight line, and
   the command generation unit includes, in the command information, a coordinate of the inspection target within the two-dimensional plane.

6. The aircraft control apparatus according to any one of supplementary notes 1 to 5, in which
   the inspection target is an electric wire, and,
   each time the aircraft passes a power pole or a power transmission tower, the display unit, the input unit, the selection unit, and the command generation unit each performs processing thereof.

7. An aircraft control method including:
   by a computer,
      displaying, on a display, an image being captured by an image capture unit included in an aircraft, and including at least one electric wire or at least one pipe that could be an inspection target;
      drawing a line within the image according to an input from a user;
      selecting an inspection target by use of the line; and
      generating command information for the aircraft to photograph the inspection target while moving along the inspection target, and transmitting the generated command information to the aircraft.

8. The aircraft control method according to supplementary note 7, further including:
   by the computer,
   after selecting the inspection target,
      repeatedly acquiring the image generated by the aircraft, and,
      when acquiring the image, generating the command information, based on a position of the inspection target within the image.

9. The aircraft control method according to supplementary note 8, in which
   the image capture unit is capable of controlling at least one of a photographing direction and magnification, and
   the command information includes control information for controlling the at least one.

10. The aircraft control method according to supplementary note 7, in which
    the command information includes determination information for the aircraft to determine the inspection target.

11. The aircraft control method according to supplementary note 10, further including:
    by the computer,
       approximating, with a straight line, the at least one electric wire or at least one pipe within the image, and also approximating the input line with a straight line;
       selecting, as the inspection target, the electric wire or the pipe nearest to the line, in a two-dimensional plane having, as variables, an inclination and a y-intercept that define a straight line; and
       including, in the command information, a coordinate of the inspection target within the two-dimensional plane.

12. The aircraft control method according to any one of supplementary notes 7 to 11, in which
    the inspection target is an electric wire,
    the aircraft control method further including,
    by the computer, each time the aircraft passes a power pole or a power transmission tower, performing the processing.

13. A program causing a computer to include:
a display function of displaying, on a display, an image being captured by an image capture unit included in an aircraft, and including at least one electric wire or at least one pipe that could be an inspection target;
an input function of drawing a line within the image according to an input from a user;
a selection function of selecting an inspection target by use of the line; and
a command generation function of generating command information for the aircraft to photograph the inspection target while moving along the inspection target, and transmitting the generated command information to the aircraft.

14. The program according to supplementary note 13, in which,
after the selection function selects the inspection target, the command generation function
repeatedly acquires the image generated by the aircraft, and,
when acquiring the image, generates the command information, based on a position of the inspection target within the image.

15. The program according to supplementary note 14, in which
the image capture unit is capable of controlling at least one of a photographing direction and magnification, and
the command information includes control information for controlling the at least one.

16. The program according to supplementary note 13, in which
the command information includes determination information for the aircraft to determine the inspection target.

17. The program according to supplementary note 16, in which
the selection function
approximates, with a straight line, the at least one electric wire or the at least one pipe within the image, and also approximates the input line with a straight line,
selects, as the inspection target, the electric wire or the pipe nearest to the line, in a two-dimensional plane having, as variables, an inclination and a y-intercept that define a straight line, and
the command generation function includes, in the command information, a coordinate of the inspection target within the two-dimensional plane.

18. The program according to any one of supplementary notes 13 to 17, in which
the inspection target is an electric wire, and,
each time the aircraft passes a power pole or a power transmission tower, the display unit, the input unit, the selection unit, and the command generation unit each performs processing thereof.

REFERENCE SIGNS LIST

10 Route setting apparatus
20 Aircraft control apparatus
30 Aircraft
110 Display unit
112 Data storage unit
120 Display
130 First acquisition unit
140 Route setting unit
150 Second acquisition unit
210 Display unit
220 Display
230 Input unit
240 Selection unit
250 Command generation unit
310 Communication unit
320 Flight control unit
330 Drive mechanism
340 Image capture control unit
350 Image capture unit

What is claimed is:

1. An aircraft control apparatus comprising:
at least one memory storing instructions; and
at least one processor configured to execute the instructions to perform operations comprising:
displaying, on a display, an image captured in an aircraft, the image including one or more electric wires or pipes that are each potential inspection targets;
respectively approximating the one or more electric wires or pipes within the image with one or more straight lines;
drawing an input line within the image according to an input from a user;
selecting, from the one or more straight lines, a straight line nearest to the input line in a two-dimensional plane to select an inspection target from the one or more electric wires or pipes, the selected straight line having, as variables, an inclination and a y-intercept that define the selected straight line;
generating command information, including a coordinate of the inspection target within the two-dimensional plane, for the aircraft to photograph the inspection target while moving along the inspection target, and transmitting the generated command information to the aircraft.

2. The aircraft control apparatus according to claim 1, wherein the operations comprise,
after selecting the inspection target,
repeatedly acquiring the image generated by the aircraft, and,
when acquiring the image, generating the command information, based on a position of the inspection target within the image.

3. The aircraft control apparatus according to claim 2, wherein
at least one of a photographing direction and magnification at which the image is captured is controllable, and
the command information includes control information for controlling the at least one of the photographing direction and the magnification.

4. The aircraft control apparatus according to claim 1, wherein
the inspection target is at least one of the one or more electric wires, and,
each time the aircraft passes a power pole or a power transmission tower, the operations are performed.

5. An aircraft control method performed by a computer and comprising:
displaying, on a display, an image captured in an aircraft, the image including one or more electric wires or pipes that are each potential inspection targets;
respectively approximating the one or more electric wires or pipes within the image with one or more straight lines;

drawing an input line within the image according to an input from a user;

selecting, from the one or more straight lines, a straight line nearest to the input line in a two-dimensional plane to select an inspection target from the one or more electric wires or pipes, the selected straight line having, as variables, an inclination and a y-intercept that define the selected straight line;

generating command information, including a coordinate of the inspection target within the two-dimensional plane, for the aircraft to photograph the inspection target while moving along the inspection target, and transmitting the generated command information to the aircraft.

6. A non-transitory computer-readable medium storing a program for causing a computer to perform operations comprising:

displaying, on a display, an image captured in an aircraft, the image including one or more electric wires or pipes that are each potential inspection targets;

respectively approximating the one or more electric wires or pipes within the image with one or more straight lines;

drawing an input line within the image according to an input from a user;

selecting, from the one or more straight lines, a straight line nearest to the input line in a two-dimensional plane to select an inspection target from the one or more electric wires or pipes, the selected straight line having, as variables, an inclination and a y-intercept that define the selected straight line;

generating command information, including a coordinate of the inspection target within the two-dimensional plane, for the aircraft to photograph the inspection target while moving along the inspection target, and transmitting the generated command information to the aircraft.

* * * * *